United States Patent
Moshtagh

[11] Patent Number: 5,921,560
[45] Date of Patent: Jul. 13, 1999

[54] DIRECT DRIVE ROTATIONAL MOTOR WITH AXIAL VACUUM

[75] Inventor: Vahid Sayad Moshtagh, San Jose, Calif.

[73] Assignee: WJ Semiconductor Equipment Group, Inc., Scotts Valley, Calif.

[21] Appl. No.: 08/796,300

[22] Filed: Feb. 7, 1997

[51] Int. Cl.$^6$ .................................................. B23B 5/22
[52] U.S. Cl. .................................. 279/3; 269/21; 451/388
[58] Field of Search .................... 279/3; 269/21; 451/388

[56] References Cited

U.S. PATENT DOCUMENTS

| | | | |
|---|---|---|---|
| 3,052,479 | 9/1962 | Trell | 279/3 |
| 3,333,571 | 8/1967 | Kokinda | 279/3 |
| 3,437,343 | 4/1969 | Greck | 279/3 |
| 3,538,883 | 11/1970 | Pollin | 279/3 |
| 3,690,780 | 9/1972 | Bjelland et al. | 279/3 |
| 3,730,134 | 5/1973 | Kadi | 279/3 |
| 4,448,403 | 5/1984 | Riessland et al. | 279/3 |
| 4,766,788 | 8/1988 | Yashiki et al. | 279/3 |
| 4,846,483 | 7/1989 | Sorensen | 279/3 |
| 4,869,481 | 9/1989 | Yabu et al. | 279/3 |
| 5,277,539 | 1/1994 | Matsui et al. | 414/735 |
| 5,374,315 | 12/1994 | deBoer et al. | 118/725 |
| 5,421,056 | 6/1995 | Tateyama et al. | 15/302 |
| 5,452,905 | 9/1995 | Bohmer et al. | 269/21 |
| 5,487,630 | 1/1996 | Campian | 269/21 |

*Primary Examiner*—Andrea L. Pitts
*Assistant Examiner*—Monica Smith
*Attorney, Agent, or Firm*—Flehr Hohbach Test Albritton & Herbert LLP

[57] ABSTRACT

A rotational support assembly for holding and rotating an article. The assembly includes a support member for holding the article and a drive mechanism for rotating the support member. A drive shaft couples the drive mechanism directly to the support member. The assembly also includes a vacuum system including at least one passageway formed in the support member and the drive shaft. The passageway extends between an inlet in the shaft for coupling the passageway to a vacuum source and an outlet opening connected to the surface of the support member for holding the article against the support member by a vacuum.

4 Claims, 3 Drawing Sheets

DIRECT DRIVE ROTATIONAL MOTOR WITH AXIAL VACUUM

BRIEF DESCRIPTION OF THE INVENTION

The present invention relates in general to a support assembly for holding and rotating an article and, more particularly, to a support having a direct drive rotational motor with an axial vacuum for holding an article against the support.

BACKGROUND OF THE INVENTION

Semiconductor processing, including cleaning and polishing of a substrate as well as deposition of films on the substrate, is one application where it is desirable to hold an article and rotate the article about an axis perpendicular to a surface of the article. Often, it is desirable to exert considerable control over the rotation of the article as well as the relative angular position of the article when the rotation of the article is interrupted.

One type of rotational support includes a vacuum chuck which is rotated by a complex drive system including belts, pulleys and a motor for driving the rotation of the chuck as well as a tensioning device for maintaining a generally constant belt tension during operation. This type of support occupies considerable space and requires frequent maintenance, including adjustment of the drive components and inspection and replacement of the belt, to ensure the rotation support is operating properly. U.S. Pat. No. 5,374,315 discloses an example of a rotational support mechanism for use in chemical vapor deposition equipment. The disclosed device includes a variable speed DC motor and a drive belt which is mounted between a pair of drive pulleys to transmit rotary power from the motor to a drive shaft coupled to the substrate support. A purge gas is fed through the shaft to the area of the substrate support.

While complex drive systems including belts and pulleys may be used to rotate a chuck or other support assembly and change the angular position of the substrate retained thereon, minimizing the components of a rotational support offers the advantages of reducing the amount of space occupied by the equipment as well as the number of maintenance and timing adjustments which are required. For those applications requiring strict control over the rotation and angular position of the substrate, a rotational support system which improves the degree of control over the rotation and position of the substrate as well as the consistency of the drive system over an extended period of time is desirable. Improving control over rotation while minimizing interruptions for maintenance, repair and the like would significantly enhance the efficiency of the operation utilizing the rotational support system.

OBJECTS AND SUMMARY OF THE INVENTION

It is a primary object of the present invention to provide a support assembly for holding and rotating an article.

It is a further object of the present invention to provide a rotational support assembly for supporting a glass substrate.

It is another object of the present invention to provide a rotational support assembly which may be used to precisely control the angular position of the article.

A more general object of the present invention is to provide a rotational support assembly having a minimal number of components and reduced spacial requirements, and a rotational support assembly in which interruptions due to maintenance and repair are significantly reduced, improving the efficiency of the operation employing the support assembly.

In summary, this invention provides a rotational support assembly, such as a rotary chuck, for holding and rotating an article such as a glass substrate. The support assembly includes a support member having a surface which is configured for holding the substrate. A drive shaft has one end coupled to the support member and the other end directly coupled to a drive mechanism. The drive mechanism applies a rotational force directly to the drive shaft for rotating the support member about an axis normal to the surface of the support member. The assembly also includes a vacuum system for holding the substrate against the support member. The vacuum system includes at least one passageway which extends between a first opening in support surface, and a second opening formed in the drive shaft for connecting the passageway to a vacuum source.

Additional objects and features of the invention will be more readily apparent from the following detailed description and appended claims when taken in conjunction with the drawings.

DETAILED DESCRIPTION OF THE INVENTION

Figure 1:
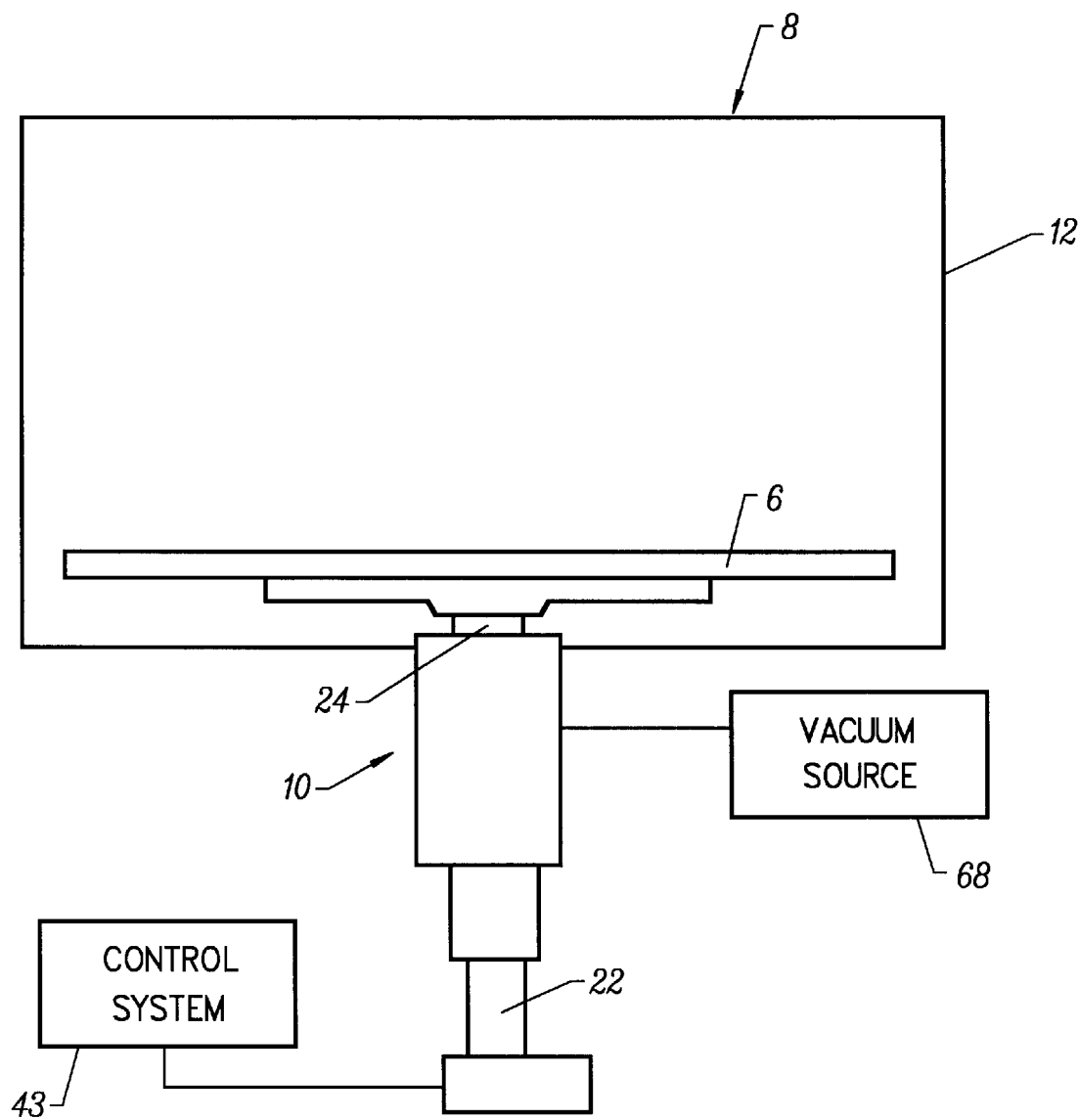
FIG. 1 is a schematic view of semiconductor processing system incorporating a rotational support assembly in accordance with this invention.

Reference will now be made in detail to the preferred embodiment of the invention, which is illustrated in the accompanying figures. Turning now to the drawings, wherein like components are designated by like reference numerals throughout the various figures, attention is directed to FIG. 1.

A semiconductor processing system 8 incorporating a rotational support assembly 10, in accordance with this invention, for holding and retaining an article 6 is shown in FIG. 1. The semiconductor system 8 generally includes a chamber 12 with the support assembly 10 extending into the chamber 12 to support the substrate 6 for processing. The rotational assembly 10 supports the article or substrate 6 during deposition and may be used for angle correction during processing. Proper orientation is needed for process control. It is important to know the physical location of the substrate during processing to monitor and evaluate any nonuniformities to reduce or minimize nonuniformities. After processing, the rotational assembly 10 is used to correctly position the substrate for transfer to a cassette. The rotational assembly 10 of this invention is not to be limited to the semiconductor processing system of FIG. 1. Instead, the support 10 may be used in any system where the ability to control the angular position is important and it is preferred that the substrate be attached to the support without using an edge clamp. Examples of such applications include, but are not limited to, cleaning equipment, chemical mechanical polishing systems, photolithography exposure tools, photo resist application tools and furnace loading tools.

Figure 2:
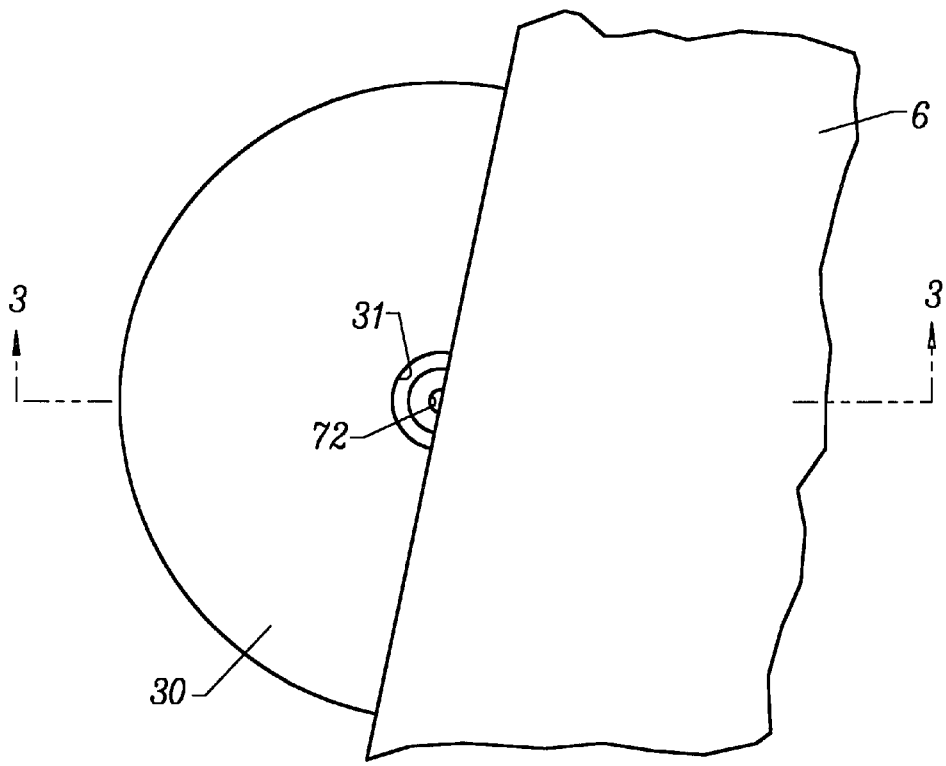
FIG. 2 is a top view of the rotational support assembly of FIG. 1, shown holding a substrate.
Figure 4:
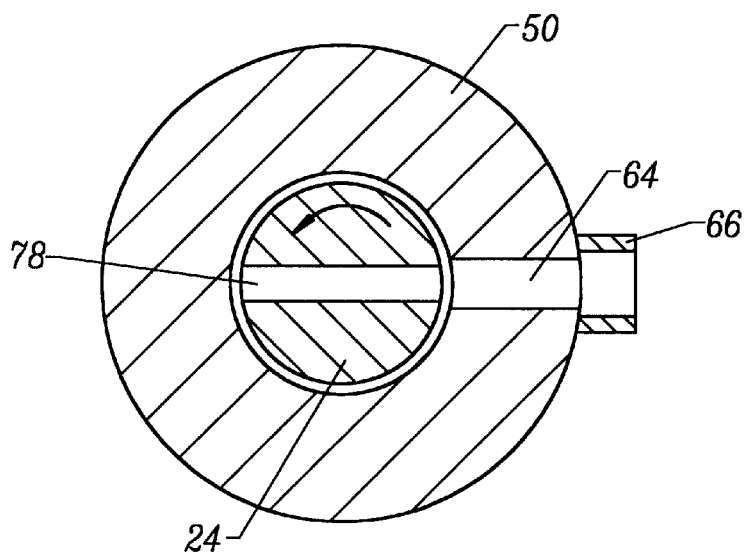
FIG. 4 is a cross sectional view taken substantially along line 4—4 of FIG. 3.
Figure 3:
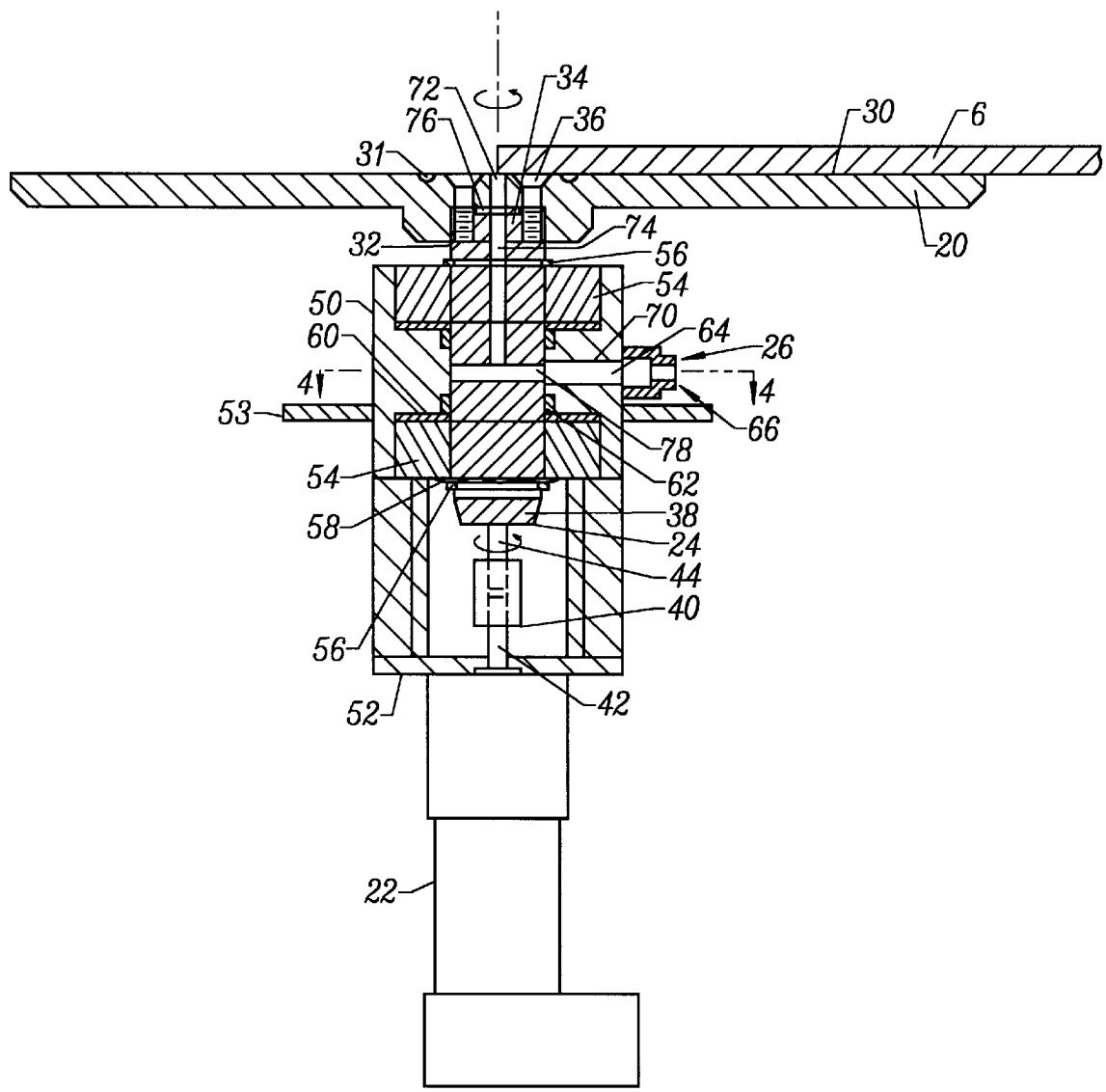
FIG. 3 is a cross-sectional view taken substantially along line 3—3 of FIG. 2, shown with a substrate positioned on the support member.

Turning to FIGS. 2–4, the rotational support assembly 10 will be discussed in more detail in relation to FIGS. 2–4. Support assembly 10, which is particularly suitable for holding and rotating an article 6, generally includes a support member 20 coupled to a drive mechanism, generally designated 22, by a drive shaft 24. The drive mechanism 22 rotates the shaft 24 to thereby impart the rotational motion on the support member 20. The rotational assembly 10 also includes a vacuum system, generally designated 26, which produces the vacuum for holding the article against the support member 20. As is shown particularly in FIG. 3, the support member 20, drive mechanism 22 and drive shaft 24 may be substantially positioned in axial alignment, minimizing the footprint of the rotational support assembly 10 as well as the total amount of space occupied by the rotational assembly. The rotational support 10 may be installed in an upright, vertical orientation so that the article 6 faces upward as shown in FIGS. 1 and 3. The support 10 may also be oriented to retain the article 6 in an inverted condition or at an angle relative to a horizontal plane depending upon the constraints of the specific application.

Support member 20 has a surface 30 for holding the article 6. As is shown particularly in FIG. 2, in the illustrated modification of the invention the surface 30 has at least one vacuum channel 31 formed therein. The surface 30 may be of any size and shape suitable for supporting and securely retaining the article 6. In this application, the article is a substrate of rectangular shape having a size on the order of 14.5 inches by 18.5 inches by 0.003 inches (370 mm by 470 mm by 0.7 mm). In this embodiment, the surface 30 of the support member is circular in shape and has a diameter of about 7 inches (178 mm). The surface 30 have other shapes and sizes within the scope of this invention.

As is shown particularly in FIG. 3, a well 32 is formed in the underside of the support member. The first or upper end 34 of the drive shaft 24 is seated in the well 32 and the drive shaft is securely mounted to the support member 20 by threaded fasteners 36. The second or lower end 38 of the shaft 24 is connected to the drive mechanism 22 via a direct drive coupling 40. The coupling 40 links the drive shaft 24 to the shaft 42 of the drive mechanism such that the drive shaft 24 and the shaft 42 function as a unit, with the rotation of the shaft 24 being initiated and terminated simultaneously with the rotation of the shaft 42. A control system 43 (FIG. 1) is coupled to the drive mechanism 22 to control the operation of the drive mechanism. In the illustrated embodiment, drive mechanism 22 is provided by an encoder gear motor which provides precise control over the rotation of the drive shaft 24 and the angular position of the support member 22. The construction of coupling 40 depends upon the type of drive mechanism 22 employed. In this embodiment, the coupling 40 ties the shaft 42 of the motor 22 to a drive pin 44 projecting from the second end 38 of the shaft 24.

The drive shaft 24 and coupling 40 are substantially enclosed within a housing 50, with the drive mechanism 22 being mounted to a mounting plate 52 on the underside of the housing 50. An exterior flange 53 of the housing is used to mount the support assembly 10 in the processing system 8. The shaft 24 is rotatably mounted to the housing 50 via spaced ball bearings 54, retaining rings 56 and leaf washer 58. The retaining rings 56 and washers 58 secure the rotating shaft 24 and bearings 54 together in a rotating assembly. Spacers 60 and ball seals 62 are positioned between the bearings 54 and the housing 50 to provide a substantially sealed region within the housing between the ball seals 62. A conduit 64 formed in the housing connects the region surrounding the exterior of shaft 24 between the ball seals 62 with a fitting 66 attached to the housing 50. The fitting 66 is connected to a vacuum source 68 (FIG. 1) as is known in the art.

With the rotational support assembly 10 of this invention, the drive shaft 24 is directly coupled to the drive mechanism 22 to rotate the support member 20, and is also coupled to the vacuum source 68 such that the drive force and the attachment force holding the article against the surface 30 of the support member 20 are both imparted through the shaft 24. The vacuum source 68 is connected to the surface 30 of the support member via a passageway, generally designated 70, which extends through the support member 20 and the drive shaft 24 between the surface 30 and the conduit 64. In the illustrated embodiment, the passageway is defined by a first conduit 72 formed in the support member between surface 30 and well 32. The first conduit is aligned with a second conduit 74 formed in the drive shaft 24. An o-ring 76 or other sealing member is disposed in the well 32 between the support member 20 and the shaft 24 around the conduit openings. The second conduit 74 extends inwardly from the end 34 of the drive shaft and to a third, transversely extending conduit 78. As is shown particularly in FIGS. 3 and 4, the conduit 78 extends through the shaft 24 between a pair of openings in the outer surface. The opposed ends of the conduit 78 are substantially coplanar with the conduit 64 formed in the housing 50. The space or gap between the shaft 24 and housing 50 provides an annular channel joining the third conduit 78 to the vacuum source 68 via the conduit 64 and fitting 66. Mounting the vacuum fitting 66 to the side of the housing 50 is preferred so that there will be no interference between the vacuum system and the drive mechanism, which is positioned in substantial axial alignment with the support member 20.

It is to be understood that the configuration of the passageway 70 is not to be limited to the configuration of the illustrated embodiment. If desired, the support assembly 10 may include more than one passageway extending through the support member 20 and the drive shaft 24. Instead of conduit 78 extending the entire diameter of the shaft 24, the passageway may include a conduit which extends from the conduit 72 to an opening in the outer surface of the shaft 24. The exterior of the shaft 24 may also be formed with an annular groove to increase the gap between the shaft 24 and the interior of the housing 50 in the area of the conduit 64.

During operation of the processing system 8, a glass substrate or other article 6 is positioned on the support surface 30. The vacuum source 68 is actuated to create a vacuum holding the substrate against the surface 30. With the substrate 6 held in place, the drive mechanism 22 is actuated to directly rotate the drive shaft 24 together with the rotation of the shaft 42 of the mechanism 22. The article 6 is retained against the support member 20 while the support member is rotated, changing the angular position of the article 6. The control system 43 controls the operation of the drive mechanism 22, which precisely controls the rotation of the shaft 24 and the angular position of the support member 20.

The rotational support assembly 10 may be used to precisely control the angular position of a substrate or other supported article during processing. Tests of the support assembly 10 found that for 80 rotations, the rotational support 10 of this invention exhibited a maximum measured deviation of about 1.2 mm and an average deviation of about 0.4 mm, demonstrating an angular deviation of about only 0.35 to 0.4°. When testing displacement error for one complete 360° rotation, the system consistently rotated the substrate to within 1 mm of the starting position. Thus, the rotational support system offers the advantages of considerable accuracy in substrate position while minimizing the size of the drive system and the maintenance and service which may be required.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. A rotational support assembly for holding and rotating an article comprising:

a rotatable support member having a surface configured for holding an article;

a drive mechanism for rotating said support member about a rotational axis perpendicular to said surface;

a drive shaft directly coupling said support member to said drive mechanism and where said drive shaft has a first end coupled to said support member and an outer surface, and a first conduit extending inwardly from said first end and a second conduit extending from said first conduit to spaced openings in said outer surface;

a vacuum system for holding an article against said surface, said vacuum system including at least one passageway formed in said support member and said shaft, said passageway extending between an inlet in said shaft defined by said spaced openings for coupling said passageway to a vacuum source and an outlet in said surface of said support member for holding said article against said surface;

a stationary housing having an interior and a port extending between said interior and the exterior of said housing for connecting said interior to a vacuum source, said drive shaft being positioned with said inlet being positioned in said interior of said housing; and a direct drive coupling device coupling said drive shaft to said drive mechanism, in which said drive shaft and said drive mechanism are substantially aligned with said rotational axis.

2. The rotational support assembly of claim 1, and further comprising a vacuum source coupled to said passageway for holding an article against said surface of said support member by the vacuum force generated by said vacuum source.

3. A chuck assembly for holding and rotating an article comprising:

a rotatable support member having a surface configured for holding a substrate;

a drive shaft having a first end coupled to said support member and a second end, and a first conduit extending inwardly from said first end and a second conduit extending from said first conduit to said second opening, and a third opening formed therein and said first conduit extending inwardly from said first end and said second conduit are joined to said first conduit and extending between said second and third openings;

a drive mechanism directly coupled to said second end of said drive shaft, said drive mechanism applying a rotational force directly to said drive shaft for rotating said support member about an axis normal to said surface of said support member;

a vacuum system for holding a substrate against said surface of said support member, said vacuum system including at least one passageway extending between a first opening formed in said surface of said support member and a second opening formed in said drive shaft for connecting said passageway to a vacuum source; and a stationary housing enclosing said second opening formed in said drive shaft, said housing including a port for connecting said second opening to a vacuum source, and an interior connected to said port and said drive shaft extends through said interior, said housing including seal members between said housing and said drive shaft for substantially sealing said interior; and a direct drive coupling device coupling said drive shaft to said drive mechanism, in which said drive shaft and said drive mechanism are substantially aligned with said rotational axis in which said drive shaft and said drive mechanism are substantially aligned with said rotational axis.

4. The rotational support assembly of claim 3, and further comprising a vacuum source coupled to said passageway for holding an article against said surface of said support member by the vacuum force generated by said vacuum source.

* * * * *